United States Patent
Hansen et al.

(10) Patent No.: US 7,933,466 B2
(45) Date of Patent: Apr. 26, 2011

(54) GREY VALUE CORRECTION METHOD FOR BINARY IMAGE DATA

(75) Inventors: Michael Hansen, Kiel (DE); Jörg Olaf Von Wechgeln, Wattenbek (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 1338 days.

(21) Appl. No.: 10/811,475

(22) Filed: Mar. 24, 2004

(65) Prior Publication Data

US 2004/0247200 A1    Dec. 9, 2004

(30) Foreign Application Priority Data

Jun. 6, 2003 (DE) .................................. 103 25 621

(51) Int. Cl.
*G06K 9/40* (2006.01)
(52) U.S. Cl. ....................................... 382/264; 382/274
(58) Field of Classification Search .......... 382/168–172, 382/237, 264, 266, 272; 358/3.01, 3.06
See application file for complete search history.

(56) References Cited

U.S. PATENT DOCUMENTS

| | | | |
|---|---|---|---|
| 4,912,569 A | 3/1990 | Petilli | |
| 4,918,622 A | 4/1990 | Granger et al. | |
| 5,333,064 A | 7/1994 | Seidner et al. | |
| 5,677,093 A * | 10/1997 | Delabastita et al. | 430/30 |
| 5,946,454 A * | 8/1999 | Shu et al. | 358/1.9 |
| 6,002,845 A * | 12/1999 | Honma | 358/1.16 |
| 6,697,168 B2 * | 2/2004 | Von Wechgeln | 358/1.9 |
| 6,717,601 B2 * | 4/2004 | Sanger | 347/115 |
| 6,724,498 B1 * | 4/2004 | Shimazaki | 358/1.8 |
| 6,907,144 B1 * | 6/2005 | Gindele | 382/275 |
| 7,031,544 B2 * | 4/2006 | Sumitomo et al. | 382/254 |
| 7,079,281 B1 * | 7/2006 | Ng et al. | 358/1.9 |
| 7,079,289 B2 * | 7/2006 | Loce et al. | 358/3.03 |
| 2001/0005270 A1 | 6/2001 | Wechgeln | |
| 2003/0137699 A1 | 7/2003 | Narazaki et al. | |

FOREIGN PATENT DOCUMENTS

| | | |
|---|---|---|
| DE | 198 26 986 C2 | 12/1999 |
| EP | 0 687 102 A2 | 12/1995 |
| EP | 0 734 151 A1 | 9/1996 |
| EP | 0 859 506 A1 | 8/1998 |

* cited by examiner

*Primary Examiner* — Anand Bhatnagar
*Assistant Examiner* — Soo Jin Park
(74) *Attorney, Agent, or Firm* — Laurence A. Greenberg; Werner H. Stemer; Ralph E. Locher

(57) ABSTRACT

A method of gray value correction for binary image data, preferably screened image data, with a local gray value by a desired correction magnitude includes filtering the image data quantized with n bits with an asymmetrical low-pass filter whose filter window is smaller than a screen cell. By a threshold value operation, corrected binary image data is obtained from the filtered image data. Optimum threshold values are selected from a threshold value table as a function of the local gray value and of the desired correction magnitude.

16 Claims, 3 Drawing Sheets

GREY VALUE CORRECTION METHOD FOR BINARY IMAGE DATA

BACKGROUND OF THE INVENTION

Field of the Invention

The present invention pertains to the field of electronic image reproduction and relates to a gray value correction method for binary image data. In electronic reproduction technology, such methods are used, in particular, in linearizing image-recording devices, with which screen areas, such as images or color separations from a printing original, are recorded pixel-by-pixel, line-by-line by at least one exposure beam on a recording material, for example, on film or on a printing plate.

The rastered exposure of a recording material pixel-by-pixel and line-by-line is usually carried out by an electronic recording device, also referred to as an exposer or recorder. For this purpose, image signal values that represent the tonal values to be recorded and that, for example, are digitized with eight bits per image point, are supplied to a screen generator, in which the tonal values are converted in accordance with a screen function into high-resolution binary image data, with which one or more exposure beams in the exposure unit of the exposer are driven. During a relative movement between the exposure beams and the material to be exposed, the exposure is carried out by the binary image data switching the exposure beams on and off and, therefore, determining that pixels as part of recorded screen points are exposed or not exposed on the material. In the process, the screen function defines the size of the screen dots as a function of the tonal values to be recorded.

During the exposure of the recording material, the real tonal values or screen dot sizes produced on the material deviate from the desired, nominal tonal values because each pixel and, therefore, each screen dot is recorded in a more or less enlarged manner as a result of over-radiation and further effects. The deviation between the tonal values actually produced and the desired tonal values is designated dot growth, which leads to disruptive tonal value changes in the reproduction. The dot growth is, therefore, compensated for before or during the exposure, by the image signal values that represent the desired tonal values being corrected in accordance with a correction curve determined in advance for the exposer and for the recording material, by what is referred to as exposure linearization such that the tonal values actually recorded on the material correspond to the desired tonal values.

The exposure linearization can be carried out in the exposure device itself or in a raster image processor (RIP) connected upstream, in which the image data for the recording is prepared. If the image data to be recorded is present in the form of tonal values quantized with n bits, the linearization can be implemented by a look-up table in which, for each possible tonal value, the correct tonal value according to the correction curve is stored. To determine the correction curve, a calibration of the recording device is carried out by a gray stage wedge being exposed and measured after the exposure. The correction values are determined from the deviations between the desired gray values and the actually exposed gray values.

However, using a simple look-up table, it is not possible to perform exposure linearization of the recording device if the image data is present in the form of binary image data, that is to say, is quantized with one bit for each image point. Binary data is produced in reproduction technology, for example, as a result of scanning line drawings, texts, graphics, or screened color separations. In digital reproduction systems, it can also be necessary to record image data already screened by an RIP, which is, then, present as binary image data in the form of what is referred to as a bitmap, on a different exposer from that originally envisaged, for example, on a film exposer instead of on a printing plate exposer. Then, exposure linearization has to be applied to the binary image data, that is to say, the size of the screen dots already present in the binary image data must be changed. One gray value correction method can, however, also be used quite generally for any desired graduation correction of the binary image data necessary for other reasons.

In principle, there is the possibility of converting the binary image data into multi-stage tonal values first of all by a descreening method, to apply exposure linearization to such data in a conventional way by a look-up table and, then, to screen the corrected tonal values again. A descreening method that operates with a plurality of selectable low-pass filters is described in U.S. Pat. No. 5,333,064 A1 to Seidner et al. Descreening has the disadvantage that a low-pass filter has to be applied to the binary image data and carries out averaging at least over the area of one screen dot cell, but, preferably, over a plurality of screen cells to calculate an average gray value that corresponds to the size of the screen dots. As a result of such intensive low-pass filtering, however, the sharpness of the image is impaired seriously and fine structures, for example, thin lines, are lost if they are narrower than the width of a raster cell.

European Patent Application EP 0 734 151 A1, corresponding to U.S. Pat. No. 5,677,093 to DeLaBastita et al., gives a description of a method of producing frequency-modulated screening, in which the smallest screen dots are varied somewhat in terms of this size and shape. As a result, the losses of the printing gamut in the very light or very dark tones, which are caused by over-radiation during the film exposure and by dot growth during printing, are minimized and an adequate final graduation of the gray values is maintained in these tonal value regions. However, the method is not suitable for the exposure linearization of a recording device that is driven with binary image data.

German Patent DE 198 26 986 C2, corresponding to United States Patent Publication No. 2001/0005270 to Wechgeln et al., describes a linearization method in which the resolution of the binary image data is initially increased sharply region by region, for example, by a factor 8. The screen dots are, then, reduced or increased in size somewhat by applying an erosion operation or a dilation operation to the high-resolution data. The image data is, then, calculated back to its original resolution again. Such a method requires a great deal of computing effort and is, therefore, slow.

SUMMARY OF THE INVENTION

It is accordingly an object of the invention to provide a grey value correction method for binary image data that overcomes the hereinafore-mentioned disadvantages of the heretofore-known devices and methods of this general type and that is suitable for the exposure linearization of recording devices and generally for correcting the graduation of binary image data and that avoids the disadvantages of the known methods. In particular, the method according to the invention is intended not to impair the sharpness and detail reproduction of the image. Furthermore, it should be capable of being carried out with a high computational speed.

With the foregoing and other objects in view, there is provided, in accordance with the invention, a method for gray value correction of binary image data with a local grey value by a desired correction magnitude, including the steps of quantizing the binary image data is with n bits, filtering the quantized image data with a low-pass filter having a filter window smaller than a screen cell, and obtaining corrected quantized image data from the filtered image data with a threshold value operation.

With the objects of the invention in view, there is also provided a method for gray value correction of screened image data with a local grey value by a desired correction magnitude, including the steps of quantizing the binary image data is with n bits, filtering the quantized image data with a low-pass filter having a filter window smaller than a screen cell, and performing a threshold value operation to obtain corrected quantized image data from the filtered image data.

The invention carries out slight low-pass filtering of the binary image data, with which the slope of the flanks of the screen dots is reduced. Using a threshold selected suitably as a function of the size of the screen dots and of the desired change in the gray value, the filtered screen dots are converted into binary image data again, the size of the screen dots being changed to the desired extent.

In accordance with another mode of the invention, there is provided the step of providing the low-pass filter with an asymmetrical distribution of filter coefficients with respect to the filter window.

In accordance with a further mode of the invention, there is provided the step of asymmetrically distributing the filter coefficients of the low-pass filter with respect to the filter window.

In accordance with an added mode of the invention, there is provided the step of obtaining the asymmetrical distribution of the filter coefficients from a symmetrical filter by shifting a filter function by fractions of an image point.

In accordance with an additional mode of the invention, there is provided the step of carrying out the threshold value operation with a threshold value selected as a function of the local gray value and of the desired correction magnitude.

In accordance with yet another mode of the invention, there is provided the step of storing threshold values in a threshold value table.

In accordance with yet a further mode of the invention, there is provided the steps of carrying out the threshold value operation with threshold values selected as a function of the local gray value and of the desired correction magnitude and storing the threshold values in a threshold value table.

In accordance with yet an added mode of the invention, there is provided the step of determining a threshold value function T1=f1(G,dG) empirically based upon model screen dots and obtaining a threshold value function T2=f2(G,dG) therefrom with approximation functions.

In accordance with yet an additional mode of the invention, there is provided the step of obtaining corrected binary image data from the corrected quantized image data by quantization with 1 bit.

In accordance with a concomitant mode of the invention, there is provided the step of quantizing the corrected quantized image data with 1 bit to obtain corrected binary image data.

Other features that are considered as characteristic for the invention are set forth in the appended claims.

Although the invention is illustrated and described herein as embodied in a grey value correction method for binary image data, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

The method according to the invention initially quantizes the binary image data with n bits by allocating to the two binary values a minimum and a maximum tonal value from the continuous tonal value range between white and black. If the method operates at an accuracy of n=16 bits per image point, for example, the allocated tonal values are the digital tonal value 0 for white and the digital tonal value 65535 for black. Tonal values lying between 0 and 65535 do not occur in the binary image data.

Figure 1:
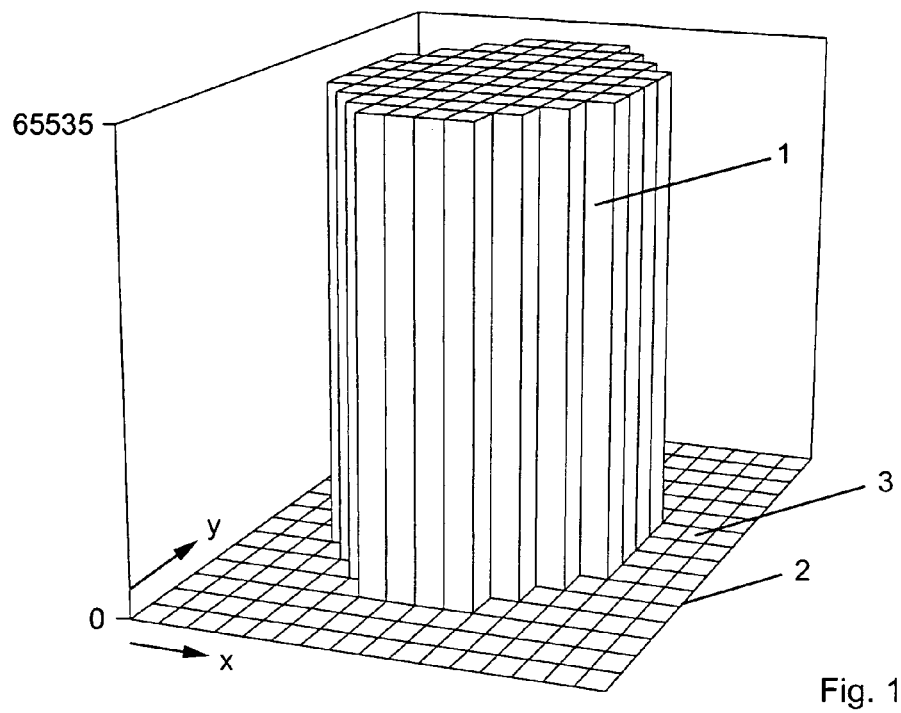
FIG. 1 is a three-dimensional graph illustrating a screen dot.

Referring now to the figures of the drawings in detail and first, particularly to FIG. 1 thereof, there is shown the image data so quantized with a three-dimensional representation of a screen dot 1 that lies in a screen cell 2 of 16×16 image points 3. The tonal values are plotted as function values depending on the local coordinates x and y of the image points 3. The image points 3 of the screen cell 2 that lie within the screen dot 1 and that, later, are to be occupied by printing ink in the print, are given the digital tonal value 65535. The image points 3 that lie outside the screen dot 1 are given the digital tonal value 0. In the three-dimensional representation, the screen dot 1 forms a plateau that projects with vertical flanks out of the plane of the screen cell 2.

The quantized image data is, then, subjected to slight low-pass filtering. As opposed to low-pass filtering that is employed in the known descreening methods and that uses a filter window that covers at least the area of one screen cell 2, the present invention uses a smaller filter window that covers only part of a screen cell 2. The filter coefficients of such a low-pass filter with a filter window that covers 5×5 image points can, for example, be derived as a filter function as a discrete approximation of a two-dimensional Gaussian distribution.

| | | | | | |
|---|---|---|---|---|---|
| 0.0039 | 0.0156 | 0.0234 | 0.0156 | 0.0039 | |
| 0.0156 | 0.0625 | 0.0938 | 0.0625 | 0.0156 | |
| 0.0234 | 0.0938 | 0.1406 | 0.0938 | 0.0234 | |
| 0.0156 | 0.0625 | 0.0938 | 0.0625 | 0.0156 | |
| 0.0039 | 0.0156 | 0.0234 | 0.0156 | 0.0039 | (1) |

In such a filter, the filter coefficients are distributed symmetrically with respect to the center of the filter window. As will be explained below, this is not beneficial to the further operations of the method according to the invention. Therefore, use is preferably made of a filter with an asymmetrical distribution of the filter coefficients. A suitable filter can be derived from filter (1) by the filter function on which the filter is based being shifted in the x direction and in the y direction by fractions of an image point, for example, by dx=0.25 image points and dy=−0.125 image points. A filter with the following filter coefficients is, then, obtained:

| 0.0021 | 0.0099 | 0.0192 | 0.0153 | 0.0051 |     |
|--------|--------|--------|--------|--------|-----|
| 0.0088 | 0.0417 | 0.0810 | 0.0649 | 0.0214 |     |
| 0.0153 | 0.0725 | 0.1411 | 0.1130 | 0.0373 |     |
| 0.0110 | 0.0520 | 0.1012 | 0.0810 | 0.0267 |     |
| 0.0032 | 0.0153 | 0.0299 | 0.0231 | 0.0079 | (2) |

Figure 2:
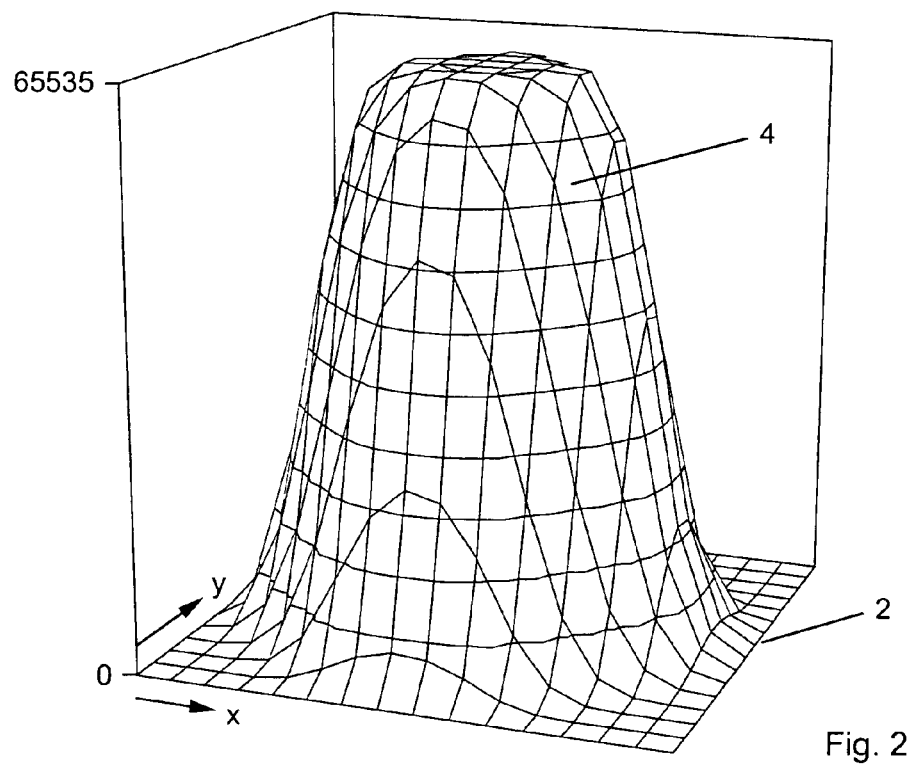
FIG. 2 is a three-dimensional graph illustrating a filtered screen dot.

FIG. 2 shows the screen dot 4 filtered with the filter (2), whose flanks have a finite slope as a result of the low-pass filtering so that the image points on the flanks of the filtered screen dot 4 are given digital tonal values that lie between the extreme values 0 and 65535. In a further step of the method according to the invention, a threshold value T is defined that lies between the extreme values, and a corrected screen dot is formed from the tonal values of the items of filtered image data that are equal to or greater than the threshold value T. This means that the image points of the filtered screen dot 4 that are equal to or greater than the threshold value T are allocated the digital tonal value 65535, and the other tonal values are allocated the digital tonal value 0. As can be seen clearly from FIG. 2, the corrected screen dot becomes smaller than the original screen dot 1 if a high threshold value T is defined, and the corrected screen dot becomes larger than the original screen dot 1 if a low threshold value T is defined.

Figure 3:
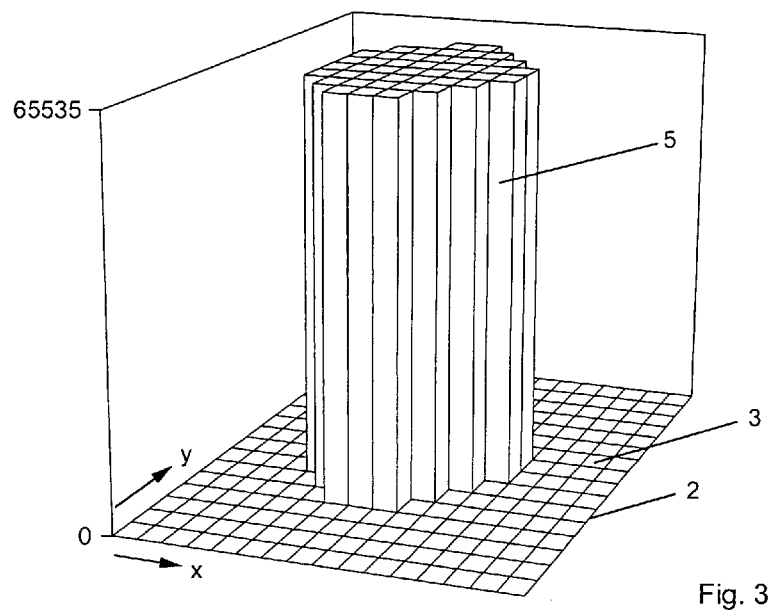
FIG. 3 is a three-dimensional graph illustrating a corrected screen dot.

FIG. 3 shows the result of such a threshold operation for an example in that, in order to illustrate the effect, a relatively high threshold value T was used as a basis. The corrected screen dot 5 has, therefore, become considerably smaller than the original screen dot 1, that is to say, it includes fewer image points 3. The corrected screen dot 5 represents a correspondingly smaller gray value than the original screen dot 1. When the method is used for exposure linearization or for correcting the graduation of the screened image data, the size of the screen dots must generally be changed in smaller steps so that the threshold value T is defined in a central range of the tonal value range between 0 and 65535. Because of the necessity to change the size of the screen dots in small steps as well, a symmetrical filter (1) is not beneficial to the method. Because the digital tonal values of the original screen dot 1 only have two values, the multiplicity of the possible tonal values in the filter result is highly restricted when a symmetrical filter (1) is used. If the original screen dot 1 is also constructed symmetrically, as in FIG. 1, the result is a screen dot 4 that is built up symmetrically with respect to the mid-axis in the x direction and the mid-axis in the y direction of the screen cell 2, that is to say, the tonal values on the flanks of the filtered screen dot 4 are equal in each of the four quadrants formed by the xy mid-axes. This results in the corrected screen dot 5 always being increased or reduced in size by at least four image points at once during a suitable change in the threshold value T. As a result, it is not possible to perform the gray value correction between the original screen dot 1 and the corrected screen dot 5 finely enough. Using an asymmetrical filter (2), such a problem is avoided, that is to say, the multiplicity of the possible tonal values in the filter result is increased and, given appropriately fine changes of the threshold value T, the corrected screen dot 5 can be increased or reduced in size by individual image points.

For sensitivity and accuracy of the gray value correction by changing the screen dot size in accordance with the method of the invention, it is critical that the threshold value T is defined optimally. Firstly, the threshold value T depends on the magnitude dG of the desired correction by that the gray value G of the original screen dot 1 is to be corrected. For a reduction in the gray value G, that is to say, a reduction in the size of the screen dot 1, the threshold value T must be increased, to be specific, by more the greater the desired correction magnitude dG is. Conversely, the threshold value must be lowered for an increase in the gray value G. Secondly, the optimum threshold value T also depends on the shape and size of the original screen dot 1 itself, however, that is to say, on the gray value G, because the shape and size of the screen dot 1 influence the exact shape of the flanks of the filtered screen dot 4. The gray value G and the correction magnitude dG are specified in screen percent in the following text, as is usual in reproduction technology for specifying the size of screen dots. If all the image points 3 of the screen cell 2 have the tonal value 0, the screen dot has the gray value G=0%, and if all the image dots 3 of the screen cell 2 have the tonal value 65535, the screen dot has the gray value G=100%. The correction magnitude dG is, likewise, specified as an absolute screen percentage, that is to say, if a screen dot 1 has the gray value G1=68%, for example, and the correction magnitude is to be dG=3%, then the corrected screen dot 5 should have the gray value G2=68+3=71%.

According to a preferred embodiment of the invention, the optimum threshold value T is stored in a threshold value table as a function of the gray value G and of the correction magnitude dG. To determine the table values, model screen dots are generated for the gray values G=1% to G=99%, the example in 1% steps, and filtered with the asymmetrical filter (2). Then, in each case for a desired correction magnitude dG, that optimum threshold value T1 with which the desired correction dG can best be implemented is determined iteratively by fine variation of the threshold value T. As such, for each gray value G and each desired correction magnitude dG, an optimum threshold value T1=f1(G,dG) is obtained. This empirically determined threshold value function is, then, smoothed further with a constant correction magnitude dG in each case, for example, with a polynomial approximation of third order so that it corresponds to a function:

$$T2 = A \times G^3 + B \times G^2 + C \times G + D, dG = const. \quad (3)$$

Figure 4:
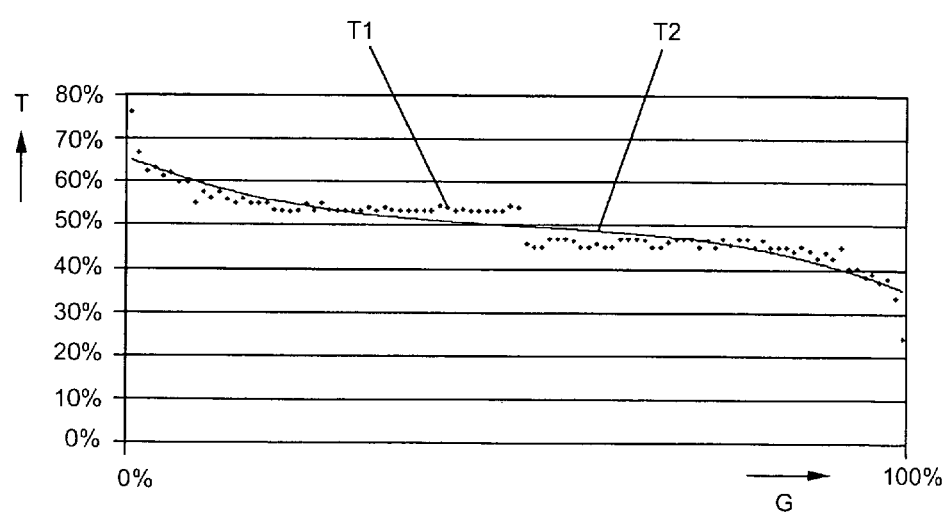
FIG. 4 is a graph depicting empirical and approximated threshold value functions T1 and T2.

FIG. 4 shows, as an example, the empirically determined threshold values T1 and the approximation function T2 as a function of the gray value G for a desired correction magnitude dG=3%, the threshold values likewise being specified as percentages of the total tonal value range. The table values T2=f2(G,dG) that are entered in the threshold value table are taken from the function values of the approximation. The threshold value table contains, for example, the optimum threshold values T2 in 1% steps for the gray value G and in 0.5% steps for the desired correction magnitude dG.

Figure 5:
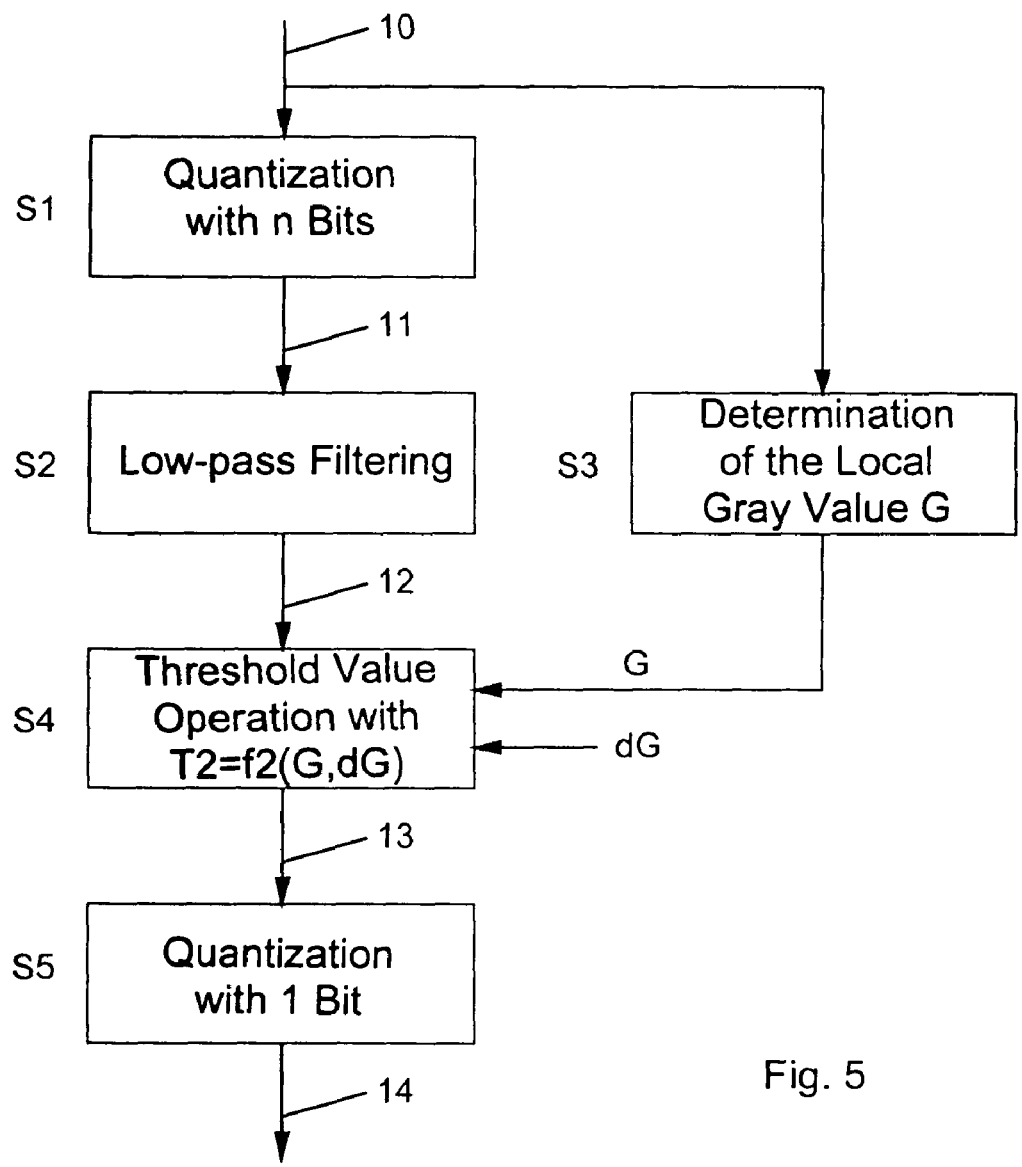
FIG. 5 is a flowchart of the method according to the invention.

FIG. 5 shows, in summary in a flowchart, the sequence of the operations when applying the method according to the invention to binary image data 10. In a first step S1, the binary image data 10 is quantized with n bits, for example, with 16 bits per image point. In step S2, the quantized image data 11 is subjected to low-pass filtering, a filter window that is smaller than a screen cell 2 being chosen. Use is preferably made of a filter with an asymmetrical distribution of the filter coefficients. As a result of the low-pass filtering, the filtered image data 12 is produced with a reduced flank slope at the transitions between the extreme values white and black. In parallel with this, in step S3, the local gray value G is determined. For such a purpose, for example, a simple average of the binary image data 10 over the area of a screen cell 2 can be formed. Alternatively, the gray value G can also be determined by low-pass filtering whose filter window covers at least one screen cell 2. Using the local gray value G and the desired correction magnitude dG for the gray value, in step S4, an optimum threshold value T2=f2(G,dG) is taken from the threshold value table and applied to the filtered image data 12, which produces the corrected quantized image data 13. This image data, which, again, has only two tonal values as a result of the threshold value operation, is finally quantized with 1 bit again in step S5, for example, the digital tonal value 65535 is allocated the binary value 1 and the digital tonal value 0 is allocated the binary value 0, which produces the binary image data 14 corrected with respect to the gray value.

This application claims the priority, under 35 U.S.C. §119, of German patent application No. 103 25 621.0, filed Jun. 6, 2003, which is hereby incorporated by reference in its entirety.

We claim:

1. A method for gray value correction of binary image data with a local grey value by a desired correction magnitude, which comprises:
   quantizing the binary image data with n bits, wherein n>1;
   filtering the quantized image data with a low-pass filter having a filter window smaller than a screen cell;
   providing the low-pass filter with an asymmetrical distribution of filter coefficients with respect to the filter window;
   obtaining the asymmetrical distribution of the filter coefficients from a symmetrical filter by shifting a filter function by fractions of an image point, said fractions being less than 1, and obtaining further coefficients for the asymmetrical distribution by using the same filter function as used for obtaining symmetrical distributions; and
   obtaining corrected quantized image data from the filtered image data with a threshold value operation.

2. The method according to claim 1, which further comprises carrying out the threshold value operation with a threshold value selected as a function of the local gray value and of the desired correction magnitude.

3. The method according to claim 2, which further comprises storing threshold values in a threshold value table.

4. The method according to claim 3, which further comprises determining a threshold value function T1=f1(G,dG) empirically based upon model screen dots and obtaining a threshold value function T2=f2(G,dG) therefrom with approximation functions.

5. The method according to claim 2, which further comprises determining a threshold value function T1=f1(G,dG) empirically based upon model screen dots and obtaining a threshold value function T2=f2(G,dG) therefrom with approximation functions.

6. The method according to claim 1, which further comprises:
   carrying out the threshold value operation with threshold values selected as a function of the local gray value and of the desired correction magnitude; and
   storing the threshold values in a threshold value table.

7. The method according to claim 6, which further comprises determining a threshold value function T1=f1(G,dG) empirically based upon model screen dots and obtaining a threshold value function T2=f2(G,dG) therefrom with approximation functions.

8. The method according to claim 1, which further comprises obtaining corrected binary image data from the corrected quantized image data by quantization with 1 bit.

9. The method according to claim 1, which further comprises quantizing the corrected quantized image data with 1 bit to obtain corrected binary image data.

10. A method for gray value correction of binary image data with a local grey value by a desired correction magnitude, which comprises:
    quantizing the binary image data with n bits, wherein n>1;
    filtering the quantized image data with a low-pass filter having a filter window smaller than a screen cell;
    asymmetrically distributing the filter coefficients of the low-pass filter with respect to the filter window;
    obtaining the asymmetrical distribution of the filter coefficients from a symmetrical filter by shifting a filter function by fractions of an image point, said fractions being less than 1, and obtaining further coefficients for the asymmetrical distribution by using the same filter function as used for obtaining symmetrical distributions; and
    obtaining corrected quantized image data from the filtered image data with a threshold value operation.

11. A method for gray value correction of screened image data with a local grey value by a desired correction magnitude, which comprises:
    quantizing the binary image data with n bits, wherein n>1, such that, in a three dimensional representation, the quantized binary image data forms a plateau having vertical flanks;
    filtering the quantized image data with a low-pass filter having a filter window smaller than a screen cell, such that, in the three dimensional representation, the slopes of the vertical flanks are reduced by the filtering; and
    asymmetrically distributing the filter coefficients of the low-pass filter with respect to the filter window;
    obtaining the asymmetrical distribution of the filter coefficients from a symmetrical filter by shifting a filter function by fractions of an image point, said fractions being less than 1, and obtaining further coefficients for the asymmetrical distribution by using the same filter function as used for obtaining symmetrical distributions; and
    performing a threshold value operation to obtain corrected quantized image data from the filtered image data.

12. The method according to claim 11, which further comprises carrying out the threshold value operation with a threshold value selected as a function of the local gray value and of the desired correction magnitude.

13. The method according to claim 12, which further comprises storing threshold values in a threshold value table.

14. The method according to claim 13, which further comprises determining a threshold value function T1=f1(G,dG) empirically based upon model screen dots and obtaining a threshold value function T2=f2(G,dG) therefrom with approximation functions.

15. The method according to claim 12, which further comprises determining a threshold value function T1=f1(G,dG) empirically based upon model screen dots and obtaining a threshold value function T2=f2(G,dG) therefrom with approximation functions.

16. The method according to claim 11, which further comprises quantizing the corrected quantized image data with 1 bit to obtain corrected binary image data.

* * * * *